US010358960B2

(12) United States Patent
Park

(10) Patent No.: US 10,358,960 B2
(45) Date of Patent: Jul. 23, 2019

(54) TORQUE CONTROL SYSTEM FOR DPF REGENERATION

(71) Applicant: VOLVO CONSTRUCTION EQUIPMENT AB, Eskilstuna (SE)

(72) Inventor: Seong-Cheol Park, Gyeongsangnam-do (KR)

(73) Assignee: Volvo Construction Equipment AB, Eskilstuna (SE)

( * ) Notice: Subject to any disclaimer, the term of this patent is extended or adjusted under 35 U.S.C. 154(b) by 44 days.

(21) Appl. No.: 15/550,427

(22) PCT Filed: Feb. 16, 2015

(86) PCT No.: PCT/KR2015/001534
§ 371 (c)(1),
(2) Date: Aug. 11, 2017

(87) PCT Pub. No.: WO2016/133226
PCT Pub. Date: Aug. 25, 2016

(65) Prior Publication Data
US 2018/0023432 A1    Jan. 25, 2018

(51) Int. Cl.
*F01N 9/00* (2006.01)
*F01N 3/023* (2006.01)
(Continued)

(52) U.S. Cl.
CPC ........... *F01N 3/0238* (2013.01); *F01N 3/023* (2013.01); *F01N 9/002* (2013.01); *F02D 29/04* (2013.01);
(Continued)

(58) Field of Classification Search
CPC .... F01N 2260/04; F01N 3/023; F01N 3/0238; F01N 9/002; F02D 2041/026;
(Continued)

(56) References Cited

U.S. PATENT DOCUMENTS 9,915,056 B2 *   3/2018   Tanaka .................... F15B 11/17
2012/0279203 A1 *  11/2012  Arai ...................... B01D 53/944
                                                              60/276

FOREIGN PATENT DOCUMENTS

EP    2423481 A1    2/2012
EP    2503266 A1    12/2012
(Continued)

OTHER PUBLICATIONS

International Search Report (dated Nov. 16, 2015) for corresponding International App. PCT/KR2015/001534.
(Continued)

*Primary Examiner* — Audrey K Bradley
*Assistant Examiner* — Anthony Ayala Delgado
(74) *Attorney, Agent, or Firm* — WRB-IP LLP

(57) ABSTRACT

A method is provided for controlling the torque of an engine when a DPF is regenerated and includes detecting outputs of a gear pump and a main hydraulic pump as parameters for correcting a DPF regeneration condition, increasing the flow rate of the gear pump or main hydraulic pump, controlling the torque of an engine so as to reach a predetermined target engine torque value as the flow rate of the gear pump or main hydraulic pump is increased, starting DPF regeneration when the torque of the engine reaches the predetermined target engine torque value, allowing the number of revolutions of the engine to be increased on the basis of the target engine torque value during the DPF regeneration, and performing the DPF regeneration until the temperature of exhaust gas reaches a predetermined target DPF regeneration temperature.

2 Claims, 2 Drawing Sheets

(51) Int. Cl.
    *F02D 29/04* (2006.01)
    *F02D 41/00* (2006.01)
    *F02D 41/02* (2006.01)
    *F02D 41/04* (2006.01)
    *F02D 41/06* (2006.01)
    *F02D 41/30* (2006.01)
    *F02D 41/38* (2006.01)
    *F02D 41/40* (2006.01)

(52) U.S. Cl.
    CPC ......... *F02D 41/021* (2013.01); *F02D 41/029* (2013.01); *F02D 41/0245* (2013.01); *F02D 41/04* (2013.01); *F02D 41/061* (2013.01); *F02D 41/30* (2013.01); *F02D 41/3827* (2013.01); *F01N 2250/02* (2013.01); *F01N 2260/04* (2013.01); *F02D 41/0055* (2013.01); *F02D 41/406* (2013.01); *F02D 2041/026* (2013.01); *F02D 2200/0802* (2013.01); *F02D 2200/101* (2013.01); *F02D 2200/1002* (2013.01); *Y02T 10/26* (2013.01); *Y02T 10/47* (2013.01)

(58) Field of Classification Search
    CPC ..... F02D 2200/0802; F02D 2200/1002; F02D 2200/101; F02D 29/04; F02D 41/0245; F02D 41/30
    See application file for complete search history.

(56) References Cited

FOREIGN PATENT DOCUMENTS

| | | |
|---|---|---|
| JP | 2004190568 A | 7/2004 |
| JP | 2005256804 A | 9/2005 |
| JP | 2006105057 A1 | 4/2006 |
| JP | 5284228 B2 | 9/2013 |
| KR | 10-2010-0072148 A | 6/2010 |
| KR | 10-2014-0088075 A | 7/2014 |

OTHER PUBLICATIONS

European Official Action (dated Sep. 17, 2018) for corresponding European App. EP 1588 2760.

\* cited by examiner

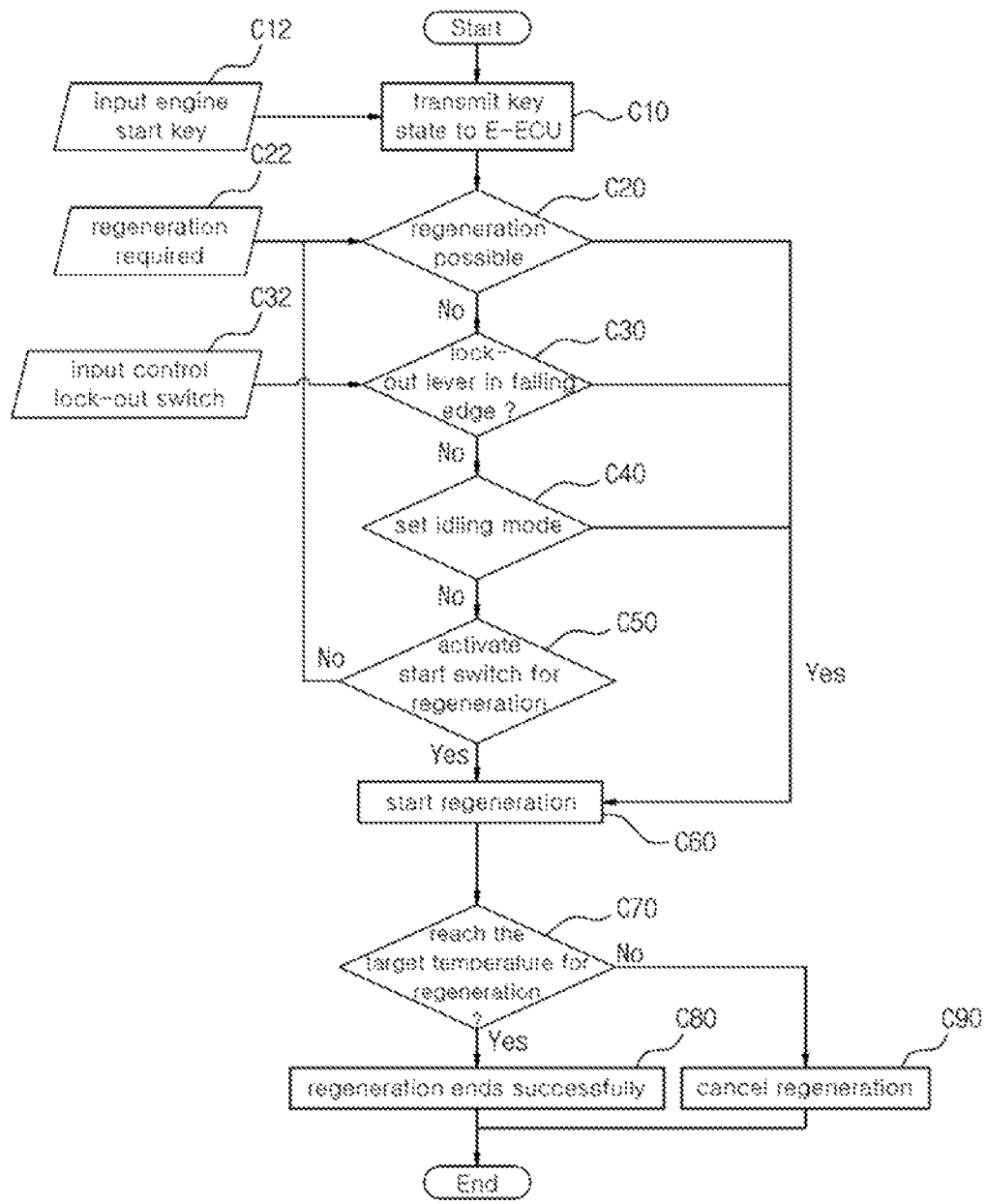
[Fig. 1]

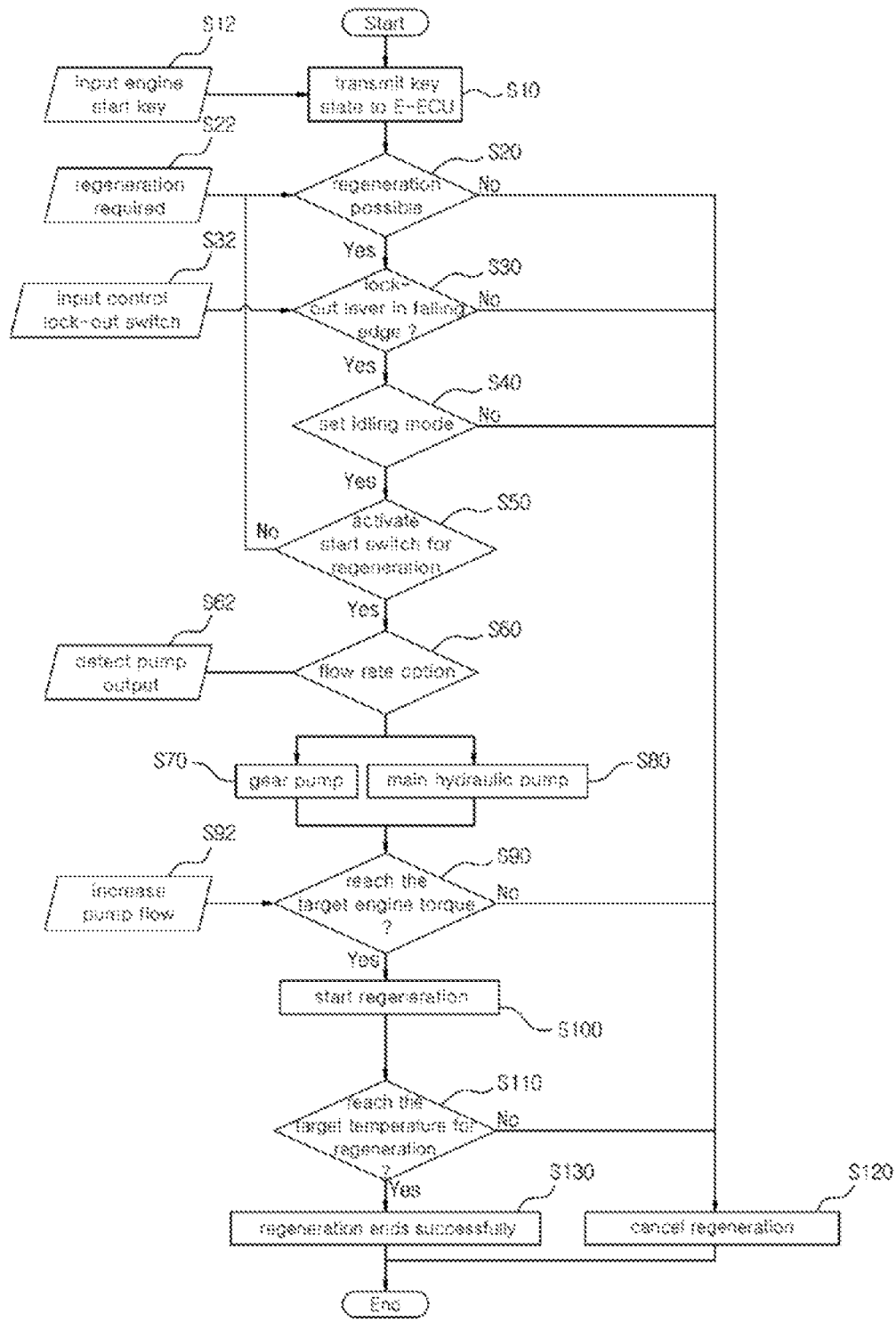

TORQUE CONTROL SYSTEM FOR DPF REGENERATION

BACKGROUND AND SUMMARY

The present invention relates to a technology for controlling an engine torque during DPF (Diesel Particulate Filter) regeneration for heavy construction equipments.

In general, a diesel engine converts the thermal energy into the mechanical energy using the mixed gas of an external air and a diesel fuel as the working fluid, in which the mixed gas is combusted explosively and exhausted out. The combusted mixed gas is exhausted through the exhaust pipe. The exhaust gas includes carbon dioxide, carbon monoxide, hydrocarbon, sulfur oxide, sulfur hydrogen, nitrogen oxide, ammonia, ozone, oxidant, etc. which cause environmental contamination if exhausted into the air as it is without treatment. Recently, the exhaustion of the noxious gases has been remarkably decreased due to the advanced technology of the exhausted gas reduction system.

However, the environmental criterion on the exhaustion of noxious gas of the vehicles is getting more reinforced to resolve the environmental problems of global warming and air pollution. In particular, the exhaustion criterion on the noxious gas exhausted from the heavy construction equipment is getting tightened.

In case of the heavy construction equipment such as excavator, DPF with DOC (Diesel Oxidation Catalyst) inside is connected to the exhaust pipe, oxidizes carbon monoxide, hydrocarbon, etc., and collects PM (Particulate Matter) to meet the exhaustion criterion.

In order to prevent the soot particles collected in the muffler of diesel engine from being accumulated in the filter and clogging the filter, the soot particles are burnt out at regular intervals so that DPF can be regenerated by the reuse of filter. If the soot particles are excessively accumulated in the filter, it not only deteriorates the engine performance but damages the filter during the DPF operation. In the worst case, it may turn off the engine.

In such DPF regeneration, the fuel is additionally injected to increase the exhausted gas temperature to the temperature required for DPF regeneration to burn Out the soot particles collected into carbon dioxide.

In the conventional method applied for excavator DPF regeneration, the engine rpm is increased to a certain level to raise the temperature high enough for the regeneration. However, the plastic load which, is generated by the friction torque occurring when the equipment is not in use and is different depending on the equipment case by case may bring about the change in engine rpm, which leads to the different result of the regeneration of the equipment case by case. This takes place as opposed to the case of using the engine test rig in which a certain level of rpm is maintained by calibrating optimally for the regeneration.

If an optimal engine rpm is not achieved in DPF regeneration, the DPF regeneration may be cancelled and there is possibility that the exhaust fumes or soot is not completely removed due to the temperature oscillation in the DOC (Diesel Oxidation Catalyst). As a result, the DPF regeneration may be frequently required and thus affect the operation time of the equipment.

Accordingly, it is desirable to provide a solution to maintain an optimized torque value for the regeneration by matching with the torque indicated in an engine regeneration calibration that is obtained by increasing a plastic load of heavy construction equipments.

In accordance with an aspect of the present invention, the flow rate of main pump or gear pump is increased if the plastic load of heavy construction equipments with an optimized calibration for DPF regeneration is low and the resulting engine torque is lower than an engine torque required for the DPF regeneration. Accordingly, the engine torque is adjusted to a target engine torque indicated for optimal DPF regeneration. Thus, the optimal DPF regeneration as in the test rig can be achieved in heavy construction equipments.

According to an aspect of the present invention having the above-described scheme, an exhaust gas temperature can be increased to a temperature high enough for DPF regeneration by increasing an engine torque to a target value using main pump or gear pump. If the exhaust gas temperature is not high enough, the DPF regeneration is stopped and the equipment should repeatedly try to regenerate DPF. According to an aspect of the present invention, the shortening of regeneration cycle due to the DPF regeneration failure can be avoided and the unnecessary fuel usage can be saved increasing the running time of the equipment. At the same time, the exhaust gas and soot can be completely removed by optimizing the DPF performance.

BRIEF DESCRIPTION OF THE DRAWINGS

FIG. 1. is a flow chart for DPF regeneration according to the conventional technology.

FIG. 2. is a flow chart for DPF regeneration according to an embodiment of the present invention.

DETAILED DESCRIPTION

Hereinafter, the present invention will be described in detail with reference to the accompanying drawings.

Although the present invention has been described with reference to the preferred embodiment in the attached figures, it is to be understood that various equivalent modifications and variations of the embodiments can be made by a person having an ordinary skill in the art without departing from the spirit and scope of the present invention as recited in the claims.

The description not relevant for the present invention has been abbreviated for clarity, and like reference numerals designate like elements throughout the specification. Unless expressed to the contrary, the word "compromise" will be understood to imply the inclusion of stated elements but not exclusion of any other elements.

FIG. 1 is a flow chart for DPF regeneration according to the conventional technology.

When an engine is turned on (C12), a condition of start key state is transmitted to E-ECU (Engine ECU). When an exhaust gas is accumulated in DPF and the regeneration of DPF is required (C22), whether or not the regeneration is possible is checked on. If the conditions for regeneration are satisfied, it proceeds right to regeneration step (C60). If not, it proceeds to the step of checking whether the conditions for regeneration are satisfied.

First, it is checked if a lock-out lever is positioned in the falling edge. (C30). The lock-out lever is a kind of safety lever, and if it is positioned in the falling edge, the equipment or vehicle is put under the state similar to parking, which can be understood to be the condition for the possible regeneration. Then it may proceed to C60.

If the lock-out lever is not in the position of falling edge, an idle mode is set and an engine rpm and an engine torque are controlled to be kept at the steady levels. (C50)

When the start key or switch is activated afterwards, the regeneration starts (C50) and the engine rpm is automatically increased to the engine rpm necessary for DPF regeneration (C60).

If the temperature of the exhaust gas reaches a target temperature, DPF regeneration is carried out successfully. (C80). If not, the regeneration is cancelled (C90).

FIG. 2 is a flow chart for DPF regeneration according to an embodiment of the present disclosure.

The initial steps of DPF regeneration according to an embodiment of the present disclosure proceed similarly to those of the DPF regeneration according to the conventional technology. In the conventional technology, the preconditions for the regeneration are checked sequentially, and if any of such conditions is met, DPF regeneration gets started. However, in the present disclosure, if all the individual conditions are not met, the regeneration is cancelled. Thus, since the conventional method is designed to start the DPF regeneration first, the probability of incomplete regeneration is relatively high. So, even if the engine torque does not reach the optimal value for the regeneration, the regeneration may proceed with the unsatisfactory result. In the method according to the present disclosure, the efficient DPF regeneration can be achieved because the regeneration is carried out under the preconditions of the regeneration are fully met.

In the initial step according to the present disclosure, a key state of engine start (S12) is transmitted to E-ECU. If the regeneration is required, the equipment or vehicle checks whether or not the regeneration can be carried out (S20). That is, if the regeneration is required due to the accumulated exhaust gas (S22), the possibility of regeneration is checked and the regeneration is cancelled if it turns out that the regeneration is not possible. (S120)

If it is found out that the DPF regeneration is possible, it is checked if the preconditions of DPF regeneration are met. First, it is checked if the lock-out lever is positioned in the falling edge. (S30). If the lock-out lever is not positioned in the falling edge, it proceeds to the cancellation step. (S120) As described above, the lock-out lever is a kind of safety lever, and if it is positioned in the falling edge, it is meant that the vehicle is kept under the parking state. In other words, if it is found out in S30 that the equipment or vehicle is not able to perform DPF regeneration at the standstill, it proceeds to the cancellation step.

If the lock-out lever is not in the position of falling edge, an idle mode is set and the engine rpm and torque are controlled to be kept at the steady levels. (S50)

If the preconditions for DPF regeneration are met, the equipment gets into DPF regeneration mode, and then proceeds to the step of determining hydraulic options for calibrating the engine state to the optimal condition of DPF regeneration. Depending on the hydraulic options, the equipment can make use of either gear pump or main pump. The optimal target value of the engine torque is predetermined by pre-test. In order to match the present engine torque with a target engine torque, the flow rate of gear pump or main pump is controlled. The equipment can increase the flow rate of the hydraulic gear pump or main pump based on the outputs of gear pump and main pump (hydraulic parameters) that are measured at S62. Just in case, both the flow rates of gear pump and main pump can be increased together.

In the step of increasing the flow rate of gear pump or main pump, the flow rates can be controlled to increase to the predetermined flow rates of gear pump or main pump.

If the flow rates are increased, the engine torque is increased, and then it proceeds to the step of E-ECU checking if the target engine torque is reached.

If the target engine torque is reached, DPF regeneration starts (S100). If not, the regeneration is cancelled (S120).

The engine torque is gradually increased to the target engine torque during the regeneration from the step S100.

In S110, it is checked if the temperature of exhaust gas reaches the temperature high enough for the regeneration. If the exhaust gas temperature does not reach the target temperature during the regeneration, the regeneration is cancelled (S120) as the condition for regeneration is not considered to be met. On the contrary, if the target temperature is reached, the regeneration is carried out successfully (S130).

The description above is considered to be only one of exemplary embodiments. The scope of the present invention is not limited to the embodiment described above, but is intended to cover various modifications by those skilled in the art within the scope of the claims of the present invention.

What is claimed is:

1. An engine torque control method for calibrating an engine torque optimized for DPF regeneration, comprising:
   entering DPF regeneration mode;
   detecting outputs of gear pump and main pump as parameters for calibrating conditions of DPF regeneration condition;
   increasing flow rate of gear pump or main hydraulic pump;
   controlling an engine torque to reach a predetermined target engine torque value according to the increase of the flow rate of the gear pump or the main hydraulic pump;
   starting the DPF regeneration if the engine torque reaches the predetermined target engine torque value;
   increasing an engine rpm based on the predetermined target engine torque value during the DPF regeneration;
   carrying out the DPF regeneration until an exhaust gas temperature reaches a predetermined target temperature;
   checking if a vehicle is under a state possible for the DPF regeneration when the DPF regeneration is required;
   checking if a precondition for the DPF regeneration is satisfied, wherein the DPF regeneration mode gets started if the precondition is satisfied, wherein the step of checking if the precondition for the DPF regeneration is satisfied comprises checking whether or not a control lock-out lever is released, and checking whether or not an idling mode exists; and
   cancelling the regeneration if the engine torque value does not reach a predetermined target engine torque value in the step of controlling the engine torque to reach the predetermined target engine torque value according to the increase of the flow rates of the gear pump or the main hydraulic pump.

2. An engine torque control method for calibrating an engine torque optimized for DPF regeneration, comprising:
   entering DPI regeneration mode;
   detecting outputs of gear pump and main pump as parameters for calibrating conditions of DPF regeneration condition;
   increasing flow rate of gear pump or main hydraulic pump;

controlling an engine torque to reach a predetermined target engine torque value according to the increase of the flow rate of the gear pimp or the main hydraulic pump;

starting the DPF regeneration if the engine torque reaches the predetermined target engine torque value;

increasing an engine rpm based on the predetermined target engine torque value during the DPF regeneration;

carrying out the DPF regeneration until an exhaust gas temperature reaches a predetermined target temperature;

checking if a vehicle is under a state possible for the DPF regeneration when the DPF regeneration is required;

checking if a precondition for the DPF regeneration is satisfied, wherein the DPF regeneration mode ads started if the precondition is satisfied, wherein the step of checking if the precondition for the DPF regeneration is satisfied comprises checking whether or not a control lock-out lever is released, and checking whether or not an idling mode exists; and cancelling the DPF regeneration if the exhaust gas temperature does not reach the predetermined target temperature for the DPF regeneration in the step of carrying out the DPF regeneration when the exhaust gas temperature reaches the predetermined target temperature for the DPF regeneration.

\* \* \* \* \*